Sept. 24, 1968 F. A. HYATT 3,402,680
FREIGHT BRACING DEVICE
Filed Aug. 24, 1966 2 Sheets-Sheet 1
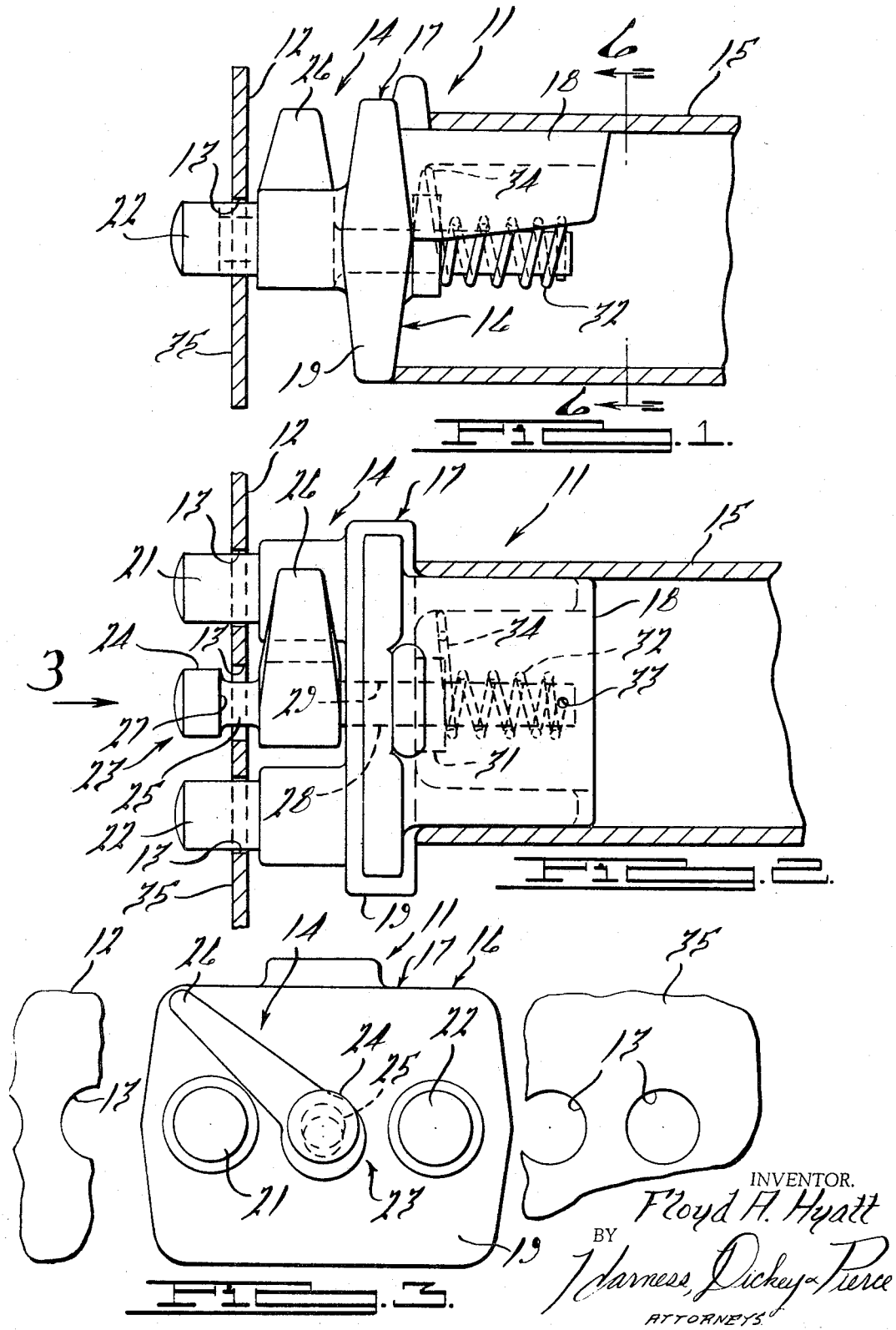
INVENTOR.
Floyd A. Hyatt
BY Harness, Dickey & Pierce
ATTORNEYS Sept. 24, 1968   F. A. HYATT   3,402,680
FREIGHT BRACING DEVICE
Filed Aug. 24, 1966   2 Sheets-Sheet 2
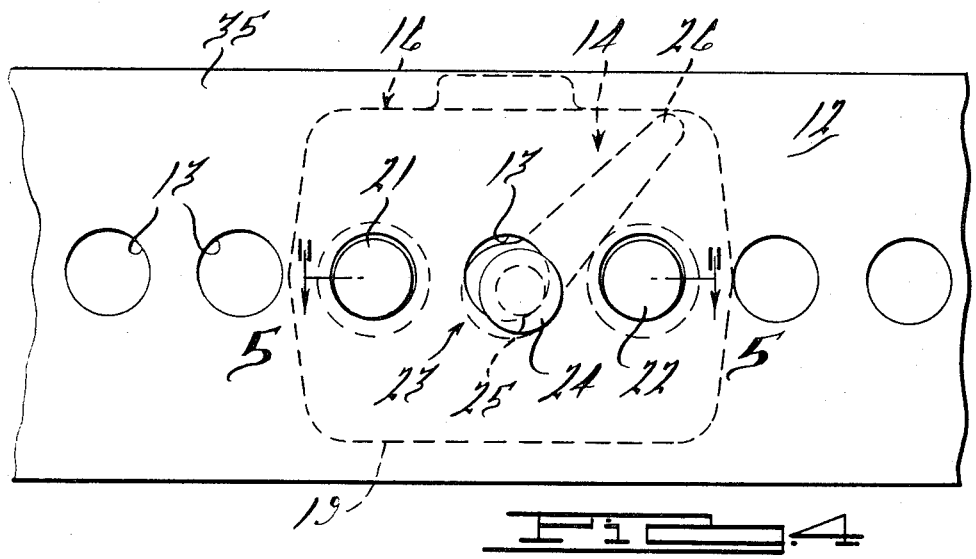
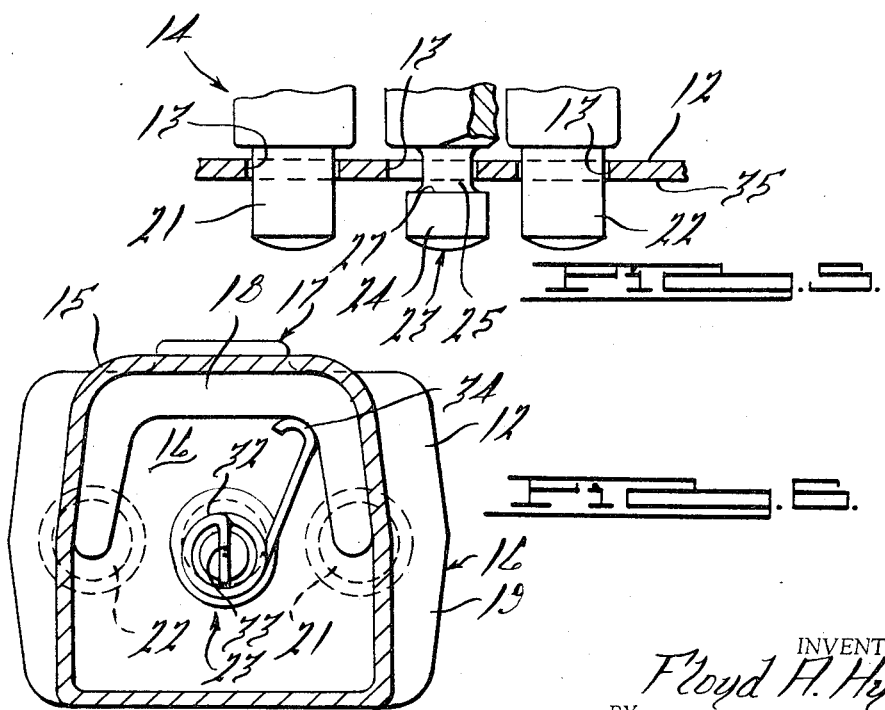
INVENTOR.
Floyd A. Hyatt
BY
Harness, Dickey & Pierce
ATTORNEYS.

United States Patent Office 3,402,680
Patented Sept. 24, 1968

3,402,680
FREIGHT BRACING DEVICE
Floyd A. Hyatt, Birmingham, Mich., assignor to Evans Products Company, a corporation of Delaware
Filed Aug. 24, 1966, Ser. No. 574,738
4 Claims. (Cl. 105—369)

ABSTRACT OF THE DISCLOSURE

A freight bracing crossbar having an end fitting with an improved locking arrangement. The locking structure includes a rotatable eccentric member that is adapted to enter into a circular aperture in a belt rail and which is disposed in part behind the belt rail when rotated to its locked position.

---

This invention relates to a freight bracing device and more particularly to an improved end fitting for attaching a freight bracing crossbar or the like to a wall of a cargo area.

Many forms of freight bracing devices have been proposed for bracing freight within cargo areas, particularly the cargo areas of vehicles such as railway cars. One common type of freight bracing device is known in the art as a "crossbar" and which comprises an elongated bar that extends between opposite side walls of the cargo area to engage and brace freight positioned between the side walls. In one common form of crossbar arrangement, end fittings are positioned at the opposite ends of the crossbar for attaching the crossbar at selected longitudinal and vertical positions with respect to the side walls. Such end fittings should provide a relatively rigid connection to the side walls so as to withstand the extreme shock loadings experienced in this type of freight handling but should be readily and easily disconnectible for adjustment or removal of the freight.

It is, therefore, a principal object of this invention to provide an improved end fitting for attaching a freight bracing crossbar or the like to the walls of the cargo area.

It is a further object of this invention to provide an improved end fitting that offers a relatively rigid connection to the side walls but can be readily disconnected.

It is yet a further object of the invention to provide an end fitting for attaching a crossbar to the cargo area walls and which insures against accidental release of the crossbar.

An end fitting embodying this invention is particularly adapted for use in attaching a freight bracing crossbar or the like to an apertured member within a cargo area. The end fitting comprises supporting means adapted to be fixed relative to the crossbar and locking means supported for pivotal movement between first and second angular positions by the supporting means. The locking means has a portion of sufficient cross sectional configuration for entry of the portion into a selected one of the apertures in the apertured member when the locking means is in its first angular position. A part of the locking means portion is disposed out of alignment with the selected aperture when the locking means is in its second angular position. This unaligned portion presents a surface facing in an opposite direction from the direction of entry into the selected aperture for abutment with the member and for precluding removal of the end fitting from the member.

Other objects and advantages of this invention will become more apparent as this description proceeds, particularly when considered in conjunction with the accompanying drawings, wherein:

FIGURE 1 is a side elevational view, with portions shown in section, of one end of the freight bracing crossbar embodying this invention as attached to a cargo area wall.

FIGURE 2 is a top view, with portions shown in section, of the crossbar shown in FIGURE 1.

FIGURE 3 is an end view, with portions broken away, taken in the direction of the arrow 3 in FIGURE 2.

FIGURE 4 is an end view, in part similar to FIGURE 3, showing the mechanism in its locked position.

FIGURE 5 is a cross-sectional view taken along the line 5—5 of FIGURE 4; and

FIGURE 6 is a cross-sectional view taken along the line 6—6 of FIGURE 1.

Referring now in detail to the drawings, the reference numeral 11 indicates one end of a freight bracing crossbar asembly embodying this invention. Although the end fitting disclosed herein is capable of use in other combinations, it is particularly adapted for attaching a freight bracing crossbar to a wall 12 of a cargo area, particularly that of a railway freight car or other vehicle. A plurality of spaced apertures 13 are formed in the wall 12 for coaction with an end fitting assembly, indicated generally by the reference numeral 14 for fixing the crossbar assembly 11 in a predetermined freight bracing location, as will become more apparent as this description proceeds.

The crossbar assembly 11 is comprised of a generally square tubular body member 15 having an open end 16 into which a portion of the end fitting assembly 14 is inserted. The end fitting assembly 14 is comprised of a body portion 17 which may be a casting or a forging or the like, and which has a generally U-shaped saddle part 18 that extends into the open end 16 of the body member 15 and may be affixed to it in any suitable manner. An enlarged face plate 19 is formed adjacent the forward end of the saddle 18 and which abuttingly engages the outer end of the body 15.

A pair of cylindrical locating pins 21 and 22 are formed integrally with the forward end of the face plate 19 and extend outwardly from it on the side opposite the saddle portion 18. The locating pins 21 and 22 are adapted to enter selected ones of the apertures 13 in the wall 12 to preclude movement of the crossbar assembly 11 in horizontal and vertical directions with respect to the wall 12. The locating pins 21 and 22 engage spaced apertures 13 with a locking mechanism, indicated generally by the reference numeral 23 being adapted to engage an aperture 13 that lies immediately between the apertures engaged by the pin portions 21 and 22 to preclude lateral movement of the crossbar assembly 11 relative to the wall 12 and to rigidly lock the crossbar assembly 11 to the wall 12.

The locking mechanism 23 is comprised of a generally cylindrical shaped portion 24 that is complementary in cross-section to the apertures 13 so that it may be freely inserted into the apertures 13 when in its released position, as will become more apparent as this description proceeds. A neck portion 25 integrally connects the cylindrical portion 24 to an operating handle portion having an outstanding lever arm 26. The neck portion 25 is smaller in diameter than the cylindrical portion 24 thus forming a shoulder 27. Adjacent the handle portion 26, a cylindrical portion 28 is formed that is journaled within a cylindrical bore 29 formed in the face plate 19 of the casting 14. A collar 31 is staked to the cylindrical portion 28 on the rear side of the face plate 19 so that the collar 31 and handle portion 26 will axially fix the locking member 23 within the forging 17 but permit angular rotation.

A coil spring 32 encircles an inwardly extending part of the cylindrical portion 28 and has one of its ends received in a groove 33 formed in the inner end of this part. The groove is upset so as to retain the spring 32 with respect to the locking member 23. The coil spring 32 has an outwardly extending arm 34 (FIGURE 6) formed at its inner end that abuts one of the depending legs of the saddle portion 18. The spring 32 is preloaded so as to exert a clockwise rotational force upon the locking member 23 as viewed in FIGURES 3 and 4.

As has been previously noted, the cylindrical portion 24 of the locking member 23 has a cross-sectional configuration that permits it to extend through an aperture 13 in the wall 12. The member 23 is journaled for rotation within the forging 17 about an axis defined by the center of the bore 29. This axis is eccentrically disposed to the center of the cylindrical portion 24 and is offset from the center of the aperture 13 in which the locking member 23 is received when the locating pins 21 and 22 are received in their respective apertures. The locking member 23 may be rotated to a disengaged position, as shown in FIGURES 1 through 3, by grasping the handle portion 26 and rotating it in a counterclockwise direction, as viewed in FIGURE 3, against the bias of the spring 32. The geometry is such that in this position the center of the cylindrical portion 24 is aligned with the aperture 13 so that the locating pins 21 and 22 and cylindrical portion 24 of the locking member 23 may be inserted into their respective apertures. When in this position, the shoulder 27 formed adjacent the cylindrical portion 24 is spaced inwardly of the inner surface 35 of the wall 12. Release of the locking handle portion 26 then permits the coil spring 32 to rotate the locking member 23 in a clockwise direction (FIGURE 4). The cylindrical portion 24 will then be eccentrically disposed with respect to the aperture 13 in which it is received (FIGURES 4 and 5) and a portion of the shoulder 27 will be displaced from the apertures 13 and face the wall surface 25 in a direction opposite to its direction of entry into the aperture 13. Thus, the end fitting 14 cannot be axially withdrawn from the apertures 13 due to the position of the locking members cylindrical portion 24. As has been previously noted, movement in transverse directions is precluded by the coaction of the locating pins 21 and 22 with their respective apertures 13.

While it will be apparent that the preferred embodiments of the invention are well calculated to fulfill the objects above stated, it will be appreciated that the invention is susceptible to modification, variation and change without departing from the proper scope or fair meaning of the subjoined claims.

What is claimed is:
1. An end fitting for attaching a freight bracing crossbar or the like to an apertured member having circular apertures and located within a cargo area, said end fitting comprising supporting means adapted to be fixed relative to the crossbar and locking means supported for pivotal movement between first and second angular positions by said supporting means, said locking means having a cylindrical pin portion of substantially the same diameter as the diameter of the apertures in the apertured member for entry of said portion into a selected one of the apertures in the apertured member when said locking means is in its first angular position, said pin portion being eccentrically disposed with respect to the pivotal axis of said locking means, the axis of said pin portion being substantially coincident with the center of the selected aperture when said locking means is in its first angular position, the axis of said pin portion being displaced from the center of the selected aperture when said locking means is in its second angular position whereby a part of said pin portion is disposed out of alignment with the selected aperture for presenting a surface facing an opposite direction from the direction of entry into the selected aperture for abutment of said surface with the apertured member and for precluding removal of said end fitting from the apertured member in said opposite direction.

2. An end fitting as set forth in claim 1 further including resilient biasing means for urging said locking means to its second angular position.

3. An end fitting as set forth in claim 2 further including locating means affixed to the supporting means and adapted to engage the aperture adjacent that engaged by the locking means for precluding movement of said end fitting in directions transverse to the direction of entry.

4. An end fitting as set forth in claim 3 wherein the locating means comprises a pair of cylindrical pins positioned on opposite sides of the locking means.

References Cited
UNITED STATES PATENTS

| | | | |
|---|---|---|---|
| 2,440,437 | 4/1948 | Fahland | 105—369 |
| 2,688,288 | 9/1954 | Harris | 105—354 |
| 2,974,611 | 3/1961 | Tangeman | 105—354 |
| 2,994,285 | 8/1961 | Dunlap | 105—369 |
| 3,066,620 | 12/1962 | Schroeder | 105—369 |

DRAYTON E. HOFFMAN, *Primary Examiner.*